April 24, 1962  E. L. ADAMS  3,030,666
METHOD FOR LOW PRESSURE MOLDING
Filed Jan. 7, 1960  2 Sheets-Sheet 1

INVENTOR
Elmer L. Adams
BY Mead, Browne, Schuyler & Beveridge
ATTORNEYS

April 24, 1962   E. L. ADAMS   3,030,666
METHOD FOR LOW PRESSURE MOLDING
Filed Jan. 7, 1960   2 Sheets-Sheet 2
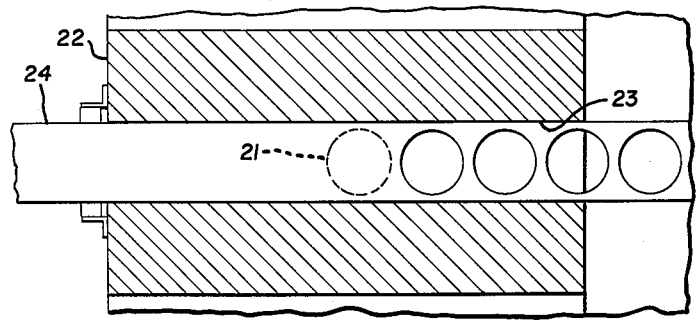
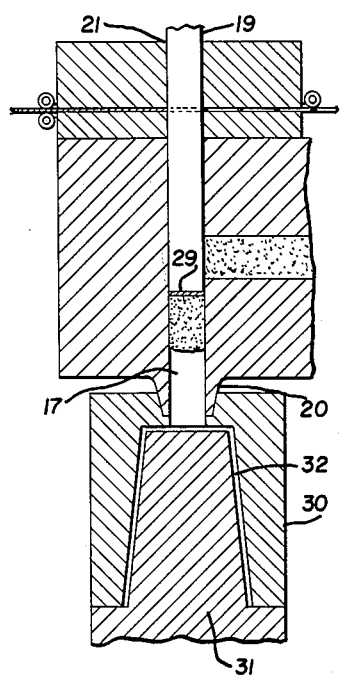
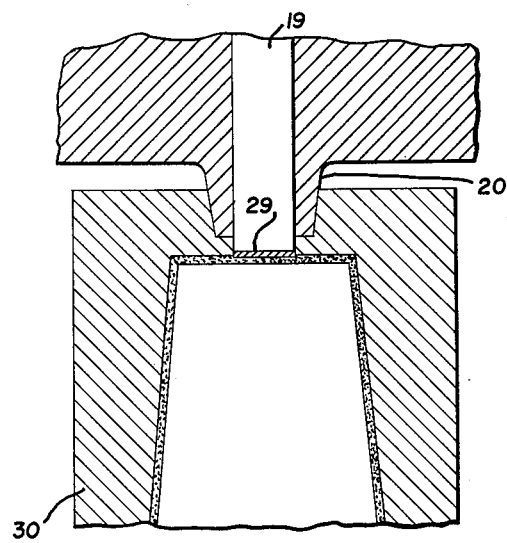
INVENTOR
*Elmer L. Adams*
ATTORNEYS

United States Patent Office
3,030,666
Patented Apr. 24, 1962

3,030,666
METHOD FOR LOW PRESSURE MOLDING
Elmer L. Adams, Toledo, Ohio, assignor to Owens-Illinois Glass Company, a corporation of Ohio
Filed Jan. 7, 1960, Ser. No. 1,091
1 Claim. (Cl. 18—55)

This invention relates to an improved method for molding plastic materials in predetermined forms whereby pressures are utilized which are lower than has heretofore been deemed to be practical.

In the copending application of Orville B. Sherman, Serial No. 678,941, filed August 19, 1957, and assigned to the assignee of the present invention, there is disclosed a method and apparatus for molding plastic materials wherein the necessity for injecting the material into a mold cavity through a highly restricted port under extremely high pressures has been eliminated. Prior to the Sherman application, the usual pressure molding of plastic materials employed a port leading to the mold, which port was restricted to accomplish proper severing of the formed article from the remaining materials. Nevertheless, a sprue or runner still remained attached to the molded article requiring a subsequent grinding to remove the sprue or runner.

In the above mentioned Sherman application, there is disclosed a method and apparatus whereby a measured quantity of heated organic molding material, sufficient to form the desired molded article, is introduced into a supply chamber in front of an injection piston. The piston then advances the material into the mold through an enlarged or unrestricted opening at a substantially reduced pressure to form the article without an integral sprue or runner. In order to prevent sticking or adhesion between the plastic material and the injection piston, a free spacer member is interposed between the plastic material and the piston, the plastic material entering the mold and being shaped therein with the spacer member in contact with the plastic material.

In the present invention, there is provided a slotted injection head, so that a web of material may be fed into the supply chamber ahead of the retracted injection piston. When the piston moves forward, it punches or stamps out a disc of the exact diameter of the piston, and this disc or spacer covers the end of the piston and comes into contact with the measured charge of heated plastic material. During the injection molding operation, the disc or spacer is transferred from the piston to the surface of the article being molded. The web may be of a thermoplastic material in which case it will be fused into the molded article, or the web may be made of paper or metal, so that it can be removed from the molded article after the molding process is completed.

It is, then, the primary object of this invention to provide an improved method for molding plastic articles wherein a spacing member is quickly and efficiently formed and interposed between an injection piston and a body of moldable plastic material.

A further object is to form the spacer member from a continuous web of material from which the injection piston punches and forms the spacer member during its injection stroke.

These and other objects, advantages and features of the invention will become apparent from the following description, taken in conjunction with the drawings, wherein:

FIGURE 2 is an enlarged fragmentary sectional view taken along the plane 2—2 in FIGURE 1;

FIGURE 3 is a fragmentary view, similar to FIGURE 1, showing a second stage of the operation of the apparatus; and FIGURE 4 is an enlarged sectional view similar to FIGURE 3 illustrating another stage of the operation of the apparatus.

Figure 1:
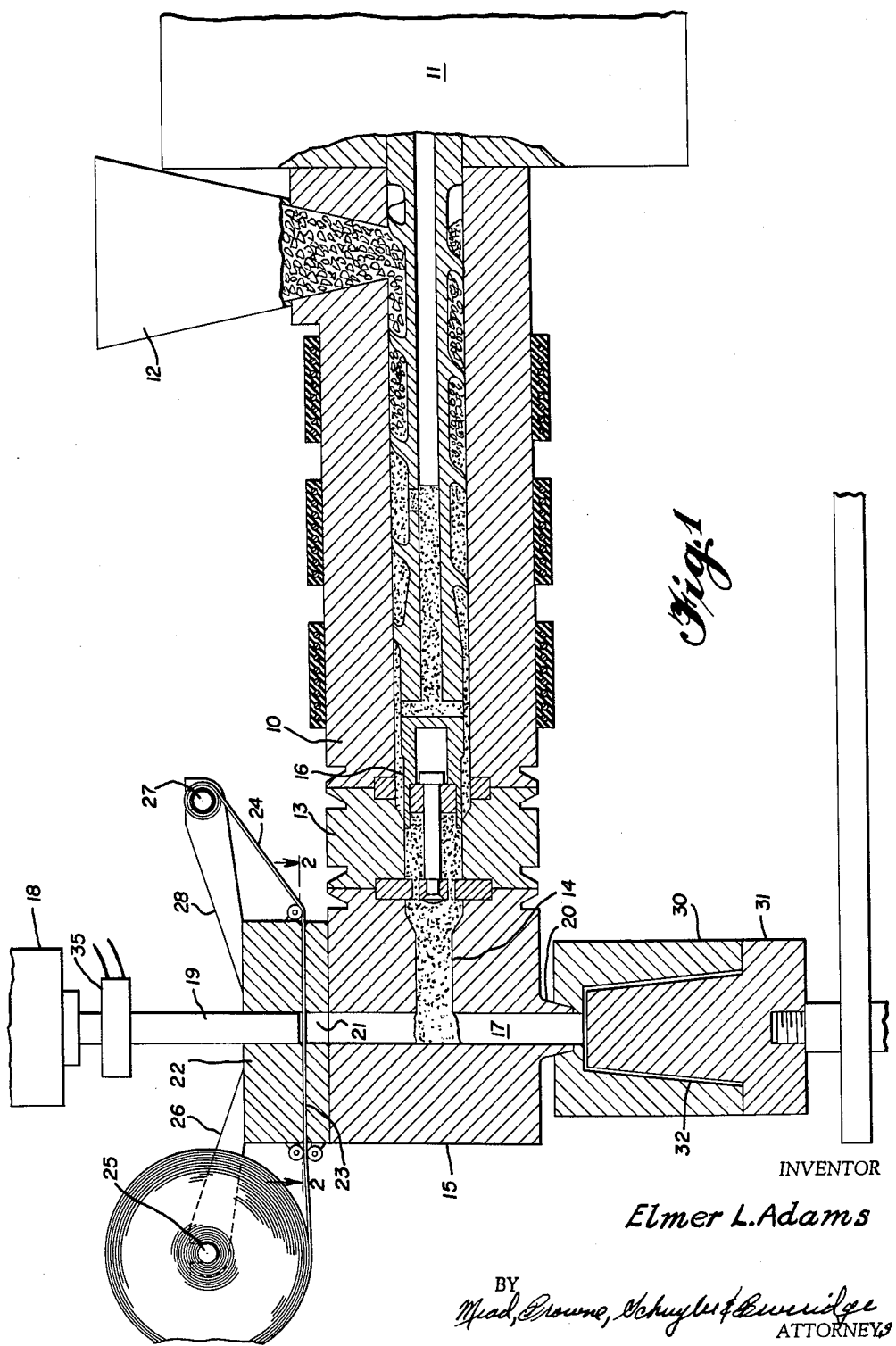
FIGURE 1 is an elevational view, with parts broken away and in section, illustrating an apparatus embodying this invention.

Referring particularly to the drawings and specifically to FIGURE 1, there is shown an extruder unit 10 which is adapted to plasticize and extrude molded material. This unit is provided with a conventional driving means 11 (not shown in detail) and a hopper 12 through which powdered or granulated material for plasticizing is fed. The extruder 10 is provided with a nozzle 13 which communicates with an inlet passage 14 in a feed block 15.

The extruder 10 is provided internally with a helical plasticizing screw 16 adapted to force or eject a measured quantity of plasticized material outwardly along the center axis of the extruder through nozzle 13 and passage 14 to a vertical chamber or passageway 17 formed in block 15. The detailed construction of the extruder 10 is disclosed in a copending application of Orville B. Sherman, Serial No. 636,559, filed January 28, 1957, now Patent No. 2,944,288, and assigned to the assignee of this invention. Mounted above the vertical passage is a fluid pressure cylinder 18 having an actuating rod 19 which reciprocates vertically within the passage 17.

The lower end of passage 17 terminates in a tip or nozzle 20 which is formed as an integral part of block 15. This nozzle 20 engages mold 30 to provide communication between passage 17 and cavity 32 formed by mold 30 and mold core 31.

A support block 22 is mounted on top of block 15 and is provided with a vertical passage 21 which is aligned with passage 17 to receive piston 19. Block 22 also is provided with a horizontal slot 23 in communication with vertical passage 21 at a position below the highest retractible position of piston 19 to receive web material 24 which (in turn) is unwound from spindle 25 supported by bracket 26 to spindle 27 supported by bracket 28. The spindles 25 and 27 are driven by suitable means (not shown) in a timed relationship to the reciprocation of piston 19.

At the beginning of the molding cycle, a measured quantity of heated organic molding material is extruded into chamber 17 while the injection piston 19 is in its retracted position as shown in FIGURE 1. With piston 19 in this position, the web, formed of paper, metal or thermoplastic material, is threaded through slot 23 from spindle 25 to spindle 27. The piston 19 is then moved downwardly along passage 21 and, as it so moves, it punches or stamps out the spacer 29 of the same size and shape as the face of the piston. When the web 24 is of a magnetic material, a magnetizer 35, which is mounted about injection piston 19, is energized during the injection stroke to magnetize the piston to hold disc 29 in contact with the piston till the end of the injection stroke.

As the piston continues its downward movement, the spacer is brought into contact with the measured amount of molding material in chamber 17, and this material and the spacer are forced downwardly toward nozzle 20 into the cavity 32 of the mold 30 as illustrated in FIGURE 3. As piston 19 reaches the end of its stroke, the molding material is forced into mold cavity 32 and the spacer 29 is brought almost flush with but slightly embedded in the molded article as shown in FIGURE 4. Piston 19 may then be retracted, leaving spacer 29 in contact with the molding material, which, because of the spacer, will not adhere to the piston. With the piston 19 back in its retracted position, web material 24 is then advanced along slot 23 to present a new usable area of web material for the next molding cycle, as illustrated in FIGURE 2.

I have disclosed but one embodiment of my invention and it will be apparent to those skilled in the art that various changes and modifications may be made therein without departing from the scope of the invention.

I claim:

In a method of pressure molding plastic articles from workable plastic material wherein a charge of plastic molding material is positioned in an elongated chamber communicating at one end with an injection mold space and a piston is positioned for movement in the chamber toward the mold space, the steps of spanning the elongated chamber intermediate the piston and the material with a web, and advancing the piston in the chamber in a single uninterrupted motion to (1) stamp a spacer from the web, (2) contact the spacer with the material, (3) displace the spacer and the material through the chamber and to the mold space, and (4) injection mold the material into the mold with said spacer intermediate the material and the piston.

References Cited in the file of this patent

UNITED STATES PATENTS

| | | |
|---|---|---|
| 1,619,354 | MacDonald | Mar. 1, 1927 |
| 2,512,275 | Hawk | June 20, 1950 |
| 2,768,560 | Hirson | Oct. 30, 1956 |
| 2,811,744 | Baldanza | Nov. 5, 1957 |
| 2,890,491 | Hendry | June 16, 1959 |